Patented July 26, 1949

2,477,272

UNITED STATES PATENT OFFICE 2,477,272

INSULATING COMPOSITION

George W. Stockton, Birmingham, England, assignor to Joseph Sankey & Sons Limited, Bilston, England No Drawing. Application August 26, 1944, Serial No. 551,455. In Great Britain September 13, 1943

1 Claim. (Cl. 260—17.2)

The invention relates to electric insulating material used in connection with electrical apparatus.

The type of electric insulating material to which the invention relates is composed mainly of starch and china clay impounded together and mixed with a proportion of water, to form it into a paste or paint which may be applied by a brush or by spraying. After application of the material the water is driven off by heat.

Such material is sold under the trade name of "Insuline."

While such material has good insulating qualities and durability, it is not wholly free from hygroscopic action and the object of this invention is to overcome this fault and at the same time improve its insulating and durability qualities.

According to the invention electric insulating material of the above type is mixed with oleaginous phenol-formaldehyde condensative resin emulsified in water.

The form of such resin which is particularly suitable for the purpose is of an oleaginous nature emulsified in water or other liquid.

Insulating composition according to the invention may be constituted by the following ingredients in the about the following proportions by weight:

| | Parts |
|---|---|
| Starch | 26 |
| China clay | 80 |
| Water | 410 | and compounded with the above is an oleaginous phenol-formaldehyde condensative resin emulsified in water in the following proportions by weight:

| | Parts |
|---|---|
| Oleaginous phenol-formaldehyde condensative resin | 67 |
| Water | 33 |

The emulsion so formed is compounded with the starch and china clay mixture in the proportion by weight of from 2 to 8 per cent.

Having fully described my invention what I claim and desire to secure by Letters Patent is:

An insulating composition in the form of a coating paste composed of the following materials in about the following proportions by weight, namely:

| | Parts |
|---|---|
| Starch | 26 |
| China clay | 80 |
| Water | 410 | to which is added from 2 to 8 percent of an emulsion in water of oleaginous phenol-formaldehyde condensative resin in about the following proportions by weight, namely:

| | Parts |
|---|---|
| Oleaginous phenol-formaldehyde condensative resin | 67 |
| Water | 33 |

GEORGE W. STOCKTON.

REFERENCES CITED

The following references are of record in the file of this patent:

UNITED STATES PATENTS

| Number | Name | Date |
|---|---|---|
| 1,160,362 | Baekeland | Nov. 16, 1915 |
| 2,213,643 | Alton | Sept. 3, 1940 |